Oct. 10, 1967      H. LINDEBOOM      3,346,009

CHECK VALVE WITH SELF-CENTERING POPPET

Filed Aug. 9, 1963

INVENTOR.
HERMAN LINDEBOOM

BY

*William Frederick Werner*
ATTORNEY

United States Patent Office 3,346,009
Patented Oct. 10, 1967

3,346,009
CHECK VALVE WITH SELF-CENTERING POPPET
Herman Lindeboom, Warwick, R.I., assignor to Sealol, Inc., Warwick, R.I., a corporation of Delaware
Filed Aug. 9, 1963, Ser. No. 301,161
3 Claims. (Cl. 137—543.17)

This invention relates to check valves and more particularly to a check valve with a self centering poppet.

An object of the present invention is to provide a check valve with a construction wherein the operating efficiency (leak proofness) and the life of the valve seat are materially increased.

Another object of the present invention is to provide a check valve with a unique spring construction which materially reduces the cost of manufacturing the valve by reducing the number of parts required to provide an efficient valve.

And still another object of the present invention is to provide a check valve poppet which is operative with or without an auxiliary valve seat depending upon the degree of pressure to be checked by the poppet.

The present invention is an improvement over United States Patents No. 2,994,340, dated Aug. 1, 1961 for a Check Valve and No. 3,029,835, dated Apr. 17, 1962 for a Check Valve With Resilient Auxiliary Seal, both of which are assigned to the assignee of the present invention.

The nub of the present invention is the elimination of the cage which slides within the valve body to support and guide the poppet into and out of valve seating position and to transfer these functions to a uniquely constructed spring.

Other objects of the present invention will be pointed out in part and become apparent in part in the following specification and claims.

Referring to the drawings in which similar characters of reference indicate corresponding parts in all the figures.

Figure 1:
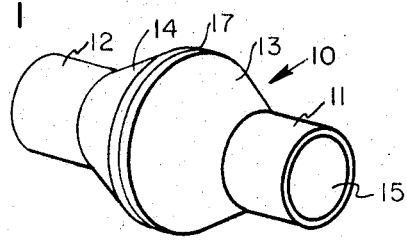
FIGURE 1 is a perspective view of the new and improved check valve with a self centering poppet.
Figure 2:
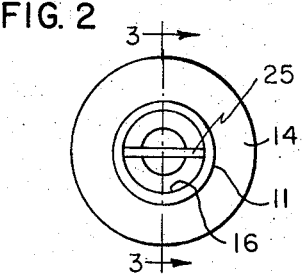
FIGURE 2 is a left side elevational view of FIGURE 1.

Reference is now directed to FIGURES 1, 2, 3 and 6 wherein is illustrated the new and improved check valve with a self centering poppet, generally indicated by reference character 10.

Check valve 10 consists of a two part housing comprising two identical half sections of drawn tubing which provide (first and second) enlarged portions 13, and 14, respectively. Enlarged portion 13 is provided with a pipe connection member 11, having an inlet passageway 15, and a conically shaped chamber wall 20. Enlarged portion 14 is provided with a pipe connection member 12, having an outlet passageway 16, and a conically shaped chamber wall 21. Enlarged portions 13, 14 are welded together, as at 17, to provide a chamber 18 having axially aligned, oppositely located, conically shaped chamber walls 20, 21 and an inlet passageway 15 and an outlet passageway 16.

Figure 6:
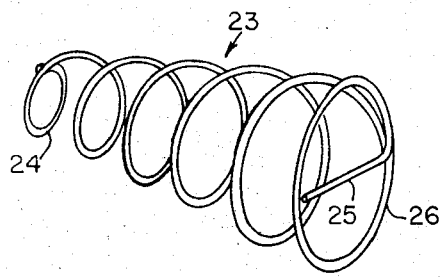
FIGURE 6 is a perspective view of spring disclosed in both forms of the invention.

A coil spring, FIGURE 6, generally indicated by reference numeral 23, is constructed in a manner, whereby starting with convolution 24 on one end, each succeeding convolution is progressively larger to provide a tapered coil spring having a tang 25 on the terminal end of the largest convolution 26. The tang 25 is preferably positioned as the medial diameter of the largest convolution.

A poppet is provided comprising a head 27 having a beveled face 28, a stem 29 and a shoulder 30.

Figure 3:
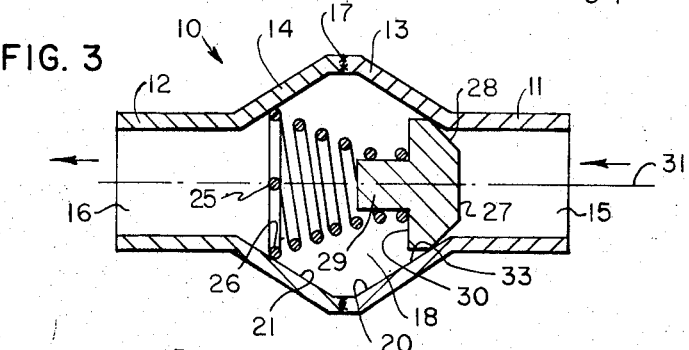
FIGURE 3 is a transverse cross sectional view taken along line 3—3 of FIGURE 2.

Check valve 10 is assembled as follows: The two identical halves forming the valve body are provided, unwelded. The poppet is placed against chamber wall 20. The largest convolution 26 of tapered coil spring 23 is placed against chamber wall 21 with stem 29 located within convolution 24 and with convolution 24 abutting shoulder 30. The two halves are pressed or pulled together and are welded on seam 17. Tapered coil spring 23 will centralize itself with respect to the horizontal axis indicated by dot and dash line 31 through check valve 10. Beveled face 28 under the influence of tapered coil spring 23 will also centralize itself with respect to horizontal axis 31. Chamber walls 20, 21 being tapered as indicated in FIGURE 3 assist both the tapered coil spring 23 and the beveled face 28 under the influence of the tension in spring 23 to centralize themselves with respect to the horizontal axis. Tapered chamber wall 20 serves the function of a valve seat at whatever circumference, indicated at 33 in FIGURE 3, beveled face 28 engages said tapered chamber wall 20.

In operation fluid will flow through inlet passageway 15 against poppet head 27. When the pressure of the fluid is strong enough to overcome the tension of tapered coil spring 23 beveled face 28 will be moved away from chamber wall 20, thereby to allow fluid to flow through chamber 18 and outlet passageway 16. As soon as the pressure of the fluid drops below the tension exerted by tapered coil spring 23, beveled face 28 will engage tapered chamber wall 20.

Thus it will be seen that a check valve is provided consisting of a minimum number of parts which can be inexpensively manufactured without the heretofore machining operations required to provide a valve seat for the poppet.

Figure 4:
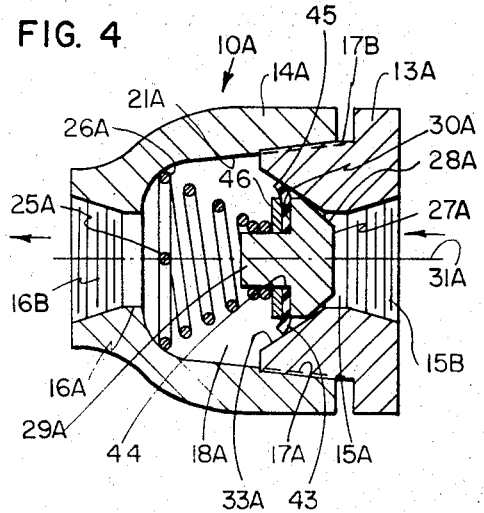
FIGURE 4 is a view similar to FIGURE 3, illustrating a modified form of valve construction; with the poppet in valve seating engagement.
Figure 5:
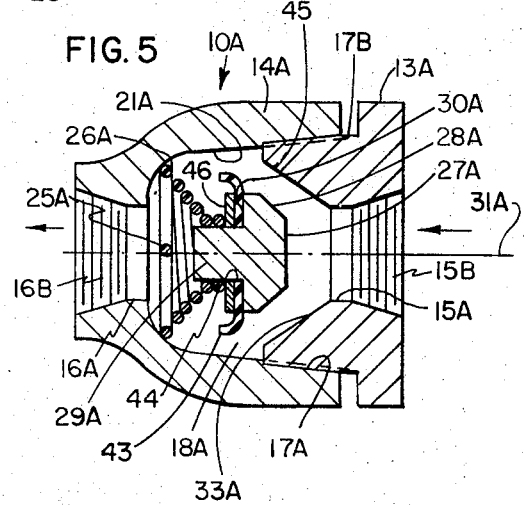
FIGURE 5 is a view similar to FIGURE 4, with the poppet unseated.

Reference is now made to the modified form of check valve illustrated in FIGURES 4, 5 and 6, generally indicated by reference numeral 10A.

Check valve 10A consists of a two part housing, a first enlarged portion and a second enlarged portion. The first enlarged portion 13A is provided with external threads 17B, a conically shaped valve seat 33A, and an inlet passageway 15A which may have a pipe thread 15B. The second enlarged portion 14A is provided with an outlet passageway 16A which may be provided with a pipe thread 16B. Second enlarged portion 14A is provided with a conically shaped chamber wall 21A which forms chamber 18A. Chamber wall 21A may be provided with an internal thread 17A. First enlarged portion 13A is secured to second enlarged portion 14A through the mating of external threads 17B with internal threads 17A. A welding process may be used to fasten first and second enlarged portions 13A, 14A together in place of threads 17A and 17B.

A poppet is provided comprising a head 27A having a beveled face 28A, a stem 29A and a shoulder 30A. A disc 43 of flexible material having an axial orifice 44 and an outside diameter 45 larger than the outside diameter of head 27A is slidably mounted upon stem 29A through axial orifice 44. A retaining washer 46 is slid along stem 29A in a "press fit" relationship to hold disc 43 against shoulder 30A. Tapered coil spring 23 is placed in chamber 18A with convolution 26 engaging chamber wall 21A and with convolution 24 surrounding stem 29A and engaging retaining washer 46 to force beveled face 28A and disc 43 against valve seat 33A.

Tapered coil spring 23 through convolution 26 will centralize itself with respect to the horizontal axis indicated by dot and dash line 31A. Beveled face 28A under the influence of tapered coil spring 23A will also centralize itself with respect to horizontal axis 31A. Chamber wall 21A being tapered or conical as indicated in FIGURES 4 and 5 and beveled face 28A also being tapered or conical as indicated in the same figures, assists, respectively, the seating of convolution 26 and beveled face 28A along a horizontal axis, as indicated at 31A.

FIGURE 4 shows beveled face 28A engaging valve seat 33A to form the "closed" position of the valve. FIGURE 5 shows beveled face 28A away from valve seat 33A in valve "open" position.

Having shown and described preferred embodiments of the present invention, by way of example, it should be realized that structural changes could be made and other examples given without departing from either the spirit or scope of this invention.

What I claim is:

1. A check valve consisting of a housing comprising two identical half sections, the first half section consisting of a first enlarged portion, providing a first conically shaped chamber wall, and a first pipe member, the second half section consisting of a second enlarged portion, providing a second conically shaped chamber wall, and a second pipe member, means fastening said first enlarged portion to said second enlarged portion to form a chamber having a first conically shaped chamber wall and a second conically shaped chamber wall, an inlet passageway to said chamber located in said first pipe member, an outlet passageway from said chamber located in said second pipe member, a poppet comprising a head having a beveled face, a stem and a shoulder, located in said chamber, a tapered coil spring having a small convolution on one end and a large convolution on the opposite end, located in said chamber with said large convolution engaging said second conically shaped chamber wall and said small convolution surrounding said stem and engaging said shoulder to yieldingly hold said beveled face against said first conically shaped chamber wall, the tension in said tapered coil spring and said first and second conically shaped walls combining to axially align said head in relation to said first conically shaped chamber wall.

2. A check valve consisting of a two part housing comprising two identical half sections, one half section having an enlarged portion providing a conically shaped chamber wall, and a pipe member providing an inlet passageway, the second half section having a second enlarged portion, providing a second conically shaped chamber wall, and a second pipe member providing an outlet passageway, means fastening said enlarged portion and said second enlarged portion together, thereby uniting said conically shaped chamber wall and said second conically shaped chamber wall to form a chamber, a poppet comprising a head, having a beveled face a stem and a shoulder, said beveled face engaging said conically shaped chamber wall in a valve seating position, and a tapered coil spring comprising a plurality of convolutions, with a terminal end of the spring at the largest convolution bent to provide a tang in the medial area of the largest convolution, said largest convolution engaging said second conically shaped wall, the smallest convolution encircling said stem and abutting said shoulder to yieldingly hold said beveled face against said conically shaped chamber wall.

3. A check valve consisting of a housing comprising two identical half sections, the first half section consisting of a first enlarged portion, providing a first conically shaped chamber wall and a first pipe member, the second half section consisting of a second enlarged portion, providing a second conically shaped chamber wall, and a second pipe member, means fastening said first enlarged portion to said second enlarged portion to form a chamber having a first conically shaped chamber wall axially aligned with said second conically shaped chamber wall, an inlet passageway to said chamber located in said first pipe member, an outlet passageway from said chamber located in said second pipe member, a poppet comprising a head having a beveled face, a stem, and a shoulder, located in said chamber, a disc of flexible material larger in diameter than said head, means securing said disc to said head, the area of said disc extending beyond said head forming an auxiliary sealing surface, a tapered coil spring having a small convolution on one end and a large convolution on the opposite end, located in said chamber with said large convolution engaging said second conically shaped chamber wall and said small convolution surrounding said stem and engaging said disc to yieldingly hold said beveled face and said auxiliary sealing surface against said first conically shaped chamber wall, said second conically shaped chamber wall and said large convolution through the tension in said tapered coil spring combining to axially align said tapered coil spring in relation to said chamber and said second conically shaped chamber wall and said beveled face under the influence of the tension in said tapered coil spring combining to axially align said poppet in relation to said chamber.

References Cited

UNITED STATES PATENTS

| | | | |
|---|---|---|---|
| 2,071,391 | 2/1937 | Crowell | 137—540 X |
| 2,400,817 | 5/1946 | Fox et al. | 137—543.17 X |
| 3,029,835 | 4/1962 | Biello et al. | 137—540 X |
| 3,176,624 | 4/1965 | Sundholm | 137—543.17 |

FOREIGN PATENTS 544,481   4/1942   Great Britain.

M. CARY NELSON, *Primary Examiner.*

H. T. KLINKSIEK, *Assistant Examiner.*